United States Patent [19]

Stine et al.

[11] 3,844,973
[45] Oct. 29, 1974

[54] FLUIDIZED CATALYST REGENERATION BY OXIDATION IN A DENSE PHASE BED AND A DILUTE PHASE TRANSPORT RISER

[75] Inventors: Laurence O. Stine, Western Springs; Algie J. Conner, Downers Grove, both of Ill.

[73] Assignee: Universal Oil Products Company, Des Plaines, Ill.

[22] Filed: May 30, 1972

[21] Appl. No.: 258,041

[52] U.S. Cl............. 252/417, 23/288 B, 23/288 S, 208/120, 208/164
[51] Int. Cl........................ B01j 11/70, B01j 11/68
[58] Field of Search ............ 252/417, 419; 208/164, 208/120; 23/288 B, 288 S

[56] References Cited
UNITED STATES PATENTS

| | | | |
|---|---|---|---|
| 2,353,505 | 7/1944 | Scheimeman | 23/288 S |
| 2,382,382 | 8/1945 | Carlsmith et al. | 252/417 |
| 2,439,811 | 4/1948 | Jewell | 252/417 |
| 2,621,118 | 12/1952 | Cyr et al. | 23/288 S |
| 2,758,068 | 7/1956 | Howard | 252/417 |
| 3,351,548 | 11/1967 | Payne et al. | 208/120 |
| 3,380,911 | 4/1968 | Owen | 208/164 |
| 3,647,714 | 3/1972 | White | 208/164 |

Primary Examiner—Daniel E. Wyman
Assistant Examiner—P. E. Konopka
Attorney, Agent, or Firm—James R. Hoatson, Jr.; Robert W. Erickson; William H. Page, II

[57] ABSTRACT

A process in which spent catalyst is regenerated with or without the complete combustion of CO in a regeneration zone comprising a first dense bed, a dilute phase transport riser and a second dense bed. Higher velocities and higher $O_2$ concentrations employed within the regeneration zone result in shorter catalyst and gas residence time, reduced catalyst inventory, lower catalyst makeup rate, improved regeneration, and improved catalyst stability. The substantially complete combustion of CO eliminates CO pollution of the atmosphere without the need for a CO boiler and decreases feed preheat requirements.

3 Claims, 3 Drawing Figures

FLUIDIZED CATALYST REGENERATION BY OXIDATION IN A DENSE PHASE BED AND A DILUTE PHASE TRANSPORT RISER

BACKGROUND OF THE INVENTION

1. Field of the Invention

The field of art to which this invention pertains is hydrocarbon processing. More particularly, this invention relates to systems in which a fluidized catalyst is continuously recycled between a reaction zone wherein it becomes spent by carbonaceous deposits and a separate regeneration zone wherein its activity is restored by removal of the deposits. Specifically, the present invention relates to a regeneration process which is applicable for the oxidative removal of carbonaceous deposits from a spent fluidized catalytic cracking catalyst.

2. Prior Art

There are a number of continuous cyclical processes employing fluidized solid techniques in which carbonaceous materials are deposited on the solids in the reaction zone and the solids are conveyed during the course of the cycle to another zone were carbon deposits are at least partially removed by combustion in an oxygen-containing medium. The solids from the latter zone are subsequently withdrawn and re-introduced in whole or in part to the reaction zone. Among such processes are fluid coking, fluid dehydrogenation, and fluid catalytic cracking.

One of the more important processes of this nature is the fluid catalytic cracking process for the conversion of relatively high-boiling hydrocarbons to lighter hydrocarbons boiling in the heating oil and gasoline (or lighter) range. The hydrocarbon feed is contacted in one or more reaction zones with the particulate cracking catalyst maintained in a fluidized state under conditions suitable for the conversion of hydrocarbons.

The gaseous effluent from the reaction zone is passed to a product recovery zone while the catalyst is generally passed to a stripping zone for removal of strippable hydrocarbons from the particles. The stripped catalyst is subsequently introduced into a fluidized regeneration zone where non-strippable carbonaceous material is contacted with an oxygen-containing gas, for example air, under conditions such that a major portion of the carbon on the catalyst particles is removed therefrom by combustion.

Generally, the regeneration is done in a single dense bed located in the bottom portion of the regeneration zone. Provisions are made for recovering and returning catalyst entrained in the flue gas effluent passing from the dense bed. This is generally carried out by passing this effluent flue gas containing entrained catalyst through cyclones located in the rather large disengaging space which is positioned above and in connection with the dense bed.

Superficial velocities within the regeneration zone are generally within the range of about 1.5 to 6 feet per second with 1.5 to 3 feet per second being the more common range. Residence time of the catalyst within the regeneration zone is generally in the 2 to 5 minute range with 2 to 3 being the more common, while the residence time of gas is generally within the range of 10 to 20 seconds.

It is the present practice to control the oxygen-containing gas stream introduced to such regeneration zone directly responsive to a predetermined temperature differential between the gas outlet disengaging space and the dense bed of the regeneration zone to minimize excess oxygen therein and to thereby control and limit the amount of afterburning of CO to $CO_2$ in the upper disengaging portion of the regeneration zone. Such practice produces a small amount of oxygen in the flue gas, generally in the range of 0.1 to 1 percent oxygen. This practice is exemplified by Pohlenz U.S. Pat. Nos. 3,161,583 and 3,206,393. Present industry practice is to direct the flue gas which contains CO either directly to the atmosphere or to a CO boiler where it is used as fuel to make steam. In other applications such as disclosed in Campbell U.S. Pat. No. 3,363,993, the flue gas is fired as fuel in a heater which is used to preheat the fresh feed charged to the reaction zone of the fluid catalytic cracking process.

Although the efficiency of cyclones and other such equipment for the recovery of solid catalyst particles is usually very high, some catalyst is always physically lost from the regeneration zone. With time, catalyst within the system loses activity and therefore becomes effectively lost because the cumulative effects of exposure to contaminant metals contained in the fresh feed, high temperatures, and steam. For these reasons, it is necessary or desirable to add fresh make-up catalyst to maintain the desired total inventory at the desired equilibrium activity of the catalyst. Typical daily make-up catalyst rates are between about 0.5 to 2.0 percent of total catalyst inventory in the system with the average being about 1% of inventory per day. Because the aforementioned catalysts are relatively expensive, it is evident that processes requiring large inventories and therefore large catalyst make-up rates tend to be less economically attractive. As a result every effort is made to reduce the initial catalyst inventory investment and that portion of overall operating costs associated with catalyst makeup.

Since most of the catalyst inventory is contained within the regeneration zone, it is the present practice to employ operating conditions in the regeneration zone that favor high carbon burning rates, thereby permitting lower regenerator inventories. Such desired operating conditions are high partial pressure of oxygen and temperature. There have been, therefore, recent industry trends toward higher pressure and higher temperature regenerators for this reason of obtaining higher burning rates. Previously the preferred pressure range had been from about 10 to about 25 psig. and preferred temperatures had been in the 1,100°–1,150°F. range. Pressures in the range of 30–40 psig. and temperatures in the range of 1,150° to 1,250° F. or higher are now rather common. Although some inventory reduction has been achieved, limitations on these approaches have been imposed by higher equipment costs due to higher pressures, by increased catalyst deactivation due to long residence time in the high temperature regenerators, and by the terminal velocity above which the catalyst cannot be maintained in the lower part of the regeneration zone as a dense bed.

Further attempts to reduce catalyst inventories and make-up rates have been made by effecting a staged regeneration within a regeneration vessel. U.S. Pat. Nos. 3,494,858 (E. C. Luckenbach) and 3,563,911 (R. W. Pfeiffer and L. W. Garret, Jr.) are such examples.

U.S. Pat. No. 3,494,858 discloses a countercurrent regeneration process in which spent catalyst is partially regenerated in a first fluidized bed with partially spent regeneration gas, further regenerated in a transfer line regeneration zone with fresh regeneration gas and then passed to a second fluidized bed wherein further regeneration may or may not take place with partially spent regeneration gas. Preferred superficial velocities are in the range of 2.5 to 3.0 ft./sec. and preferred temperatures are about 1,100° to 1,175° F. No afterburning of CO to $CO_2$ is mentioned but "substantially complete" removal of carbon to a level below 0.2 percent and possibly as low as 0.1 percent is contemplated. Substantially completely regenerated catalyst may then be stripped of high oxygen-containing gases in a separate stripper zone with steam or flue gas.

U.S. Pat. No. 3,563,911 discloses a two-stage regeneration process in which spent catalyst is partially regenerated in a first dense bed with a first oxygen-containing gas stream and then further regenerated in a second dense bed with a second oxygen-containing gas stream. A common dilute phase is superimposed above both dense beds. Preferably, superficial velocities are maintained in the range of about 2 to 4.5 feet per second and the preferred temperature range is from about 1,125° F. to 1,350° F. It is desirable in the process of this invention to control by means of a flue gas and last bed temperature differential the amount of oxygen-containing gas admitted to the regeneration zone such that only a small amount of CO afterburning takes place. This is consistent with present industry practice on single-stage regeneration zones. Examples are presented which indicate that at gas velocities of 2.5 and 4.5 feet per second some degree of inventory reduction over that of a particular type of single stage regeneration can be achieved by staging. A disadvantage, however, is that there is an upper limit of residual coke to which the catalyst can be regenerated by staging with beneficial results.

The process of our invention employs higher velocities and oxygen concentrations than those presently used in regeneration processes. By admitting fresh regeneration gas to providing for the essentially complete combustion of CO rather than the present practice of limiting the fresh regeneration gas to that required for a limited, small amount of controlled afterburning, a higher oxygen concentration results and higher temperatures and coke burning rates are obtained. Catalyst regeneration can therefore be completed in a shorter amount of time. The process of our invention employs higher velocities than those presently used to transport catalyst from a first dense bed to a dilute phase riser and then to a second dense bed. Dramatic catalyst inventory reductions are therefore possible because of the higher oxygen concentration and higher superficial velocity. Additional advantages are lower catalyst make-up rates and improved regeneration and catalyst stability. The combustion of CO eliminates an air pollution problem without the need for a CO boiler and also reduces feed preheat requirements.

SUMMARY OF THE INVENTION

Our invention can be summarized as a process for regenerating spent fluidizable catalyst removed from a reaction zone and containing carbonaceous deposits within a regeneration zone which comprises a first dense bed, a dilute phase transport riser, and a second dense bed. In the first broad embodiment the catalyst is partially regenerated in a first dense bed, further regenerated in a dilute phase transport riser, and passed to a second dense bed from which regenerated catalyst is returned to the reaction zone. In a second preferred broad embodiment carbonaceous deposits are oxidized in the first dense bed to produce partially spent regeneration gas containing CO and regenerated catalyst, the regeneration gas and regenerated catalyst are passed to a dilute phase transport riser wherein CO is combusted to $CO_2$ and the regenerated catalyst is passed to the second dense bed from which regenerated catalyst is returned to the reaction zone.

Other embodiments and a more detailed description of the foregoing embodiments will be found in the following detailed description of the process of the present invention.

DESCRIPTION OF THE DRAWING

Having thus described the invention in brief general terms, reference is now made to the schematic drawings in order to provide a better understanding of the present invention.

It is to be understood that the drawings are shown only in such details as are necessary for an understanding of the invention and that various items such as valves, bleed and dispersion steam lines, instrumentation and other process equipment and control means have been omitted therefrom for the sake of simplicity.

The drawings of this specification include FIG. 1 which depicts schematically a specific apparatus suitable for carrying out the process of our invention and FIG. 2 and FIG. 3 which depict alternative apparatus also suitable for carrying out this invention. FIGS. 2 and 3 include the same principles as FIG. 1; FIG. 3 is of particular interest because it indicates how the present invention might be applied to an existing regeneration vessel.

Figure 1:
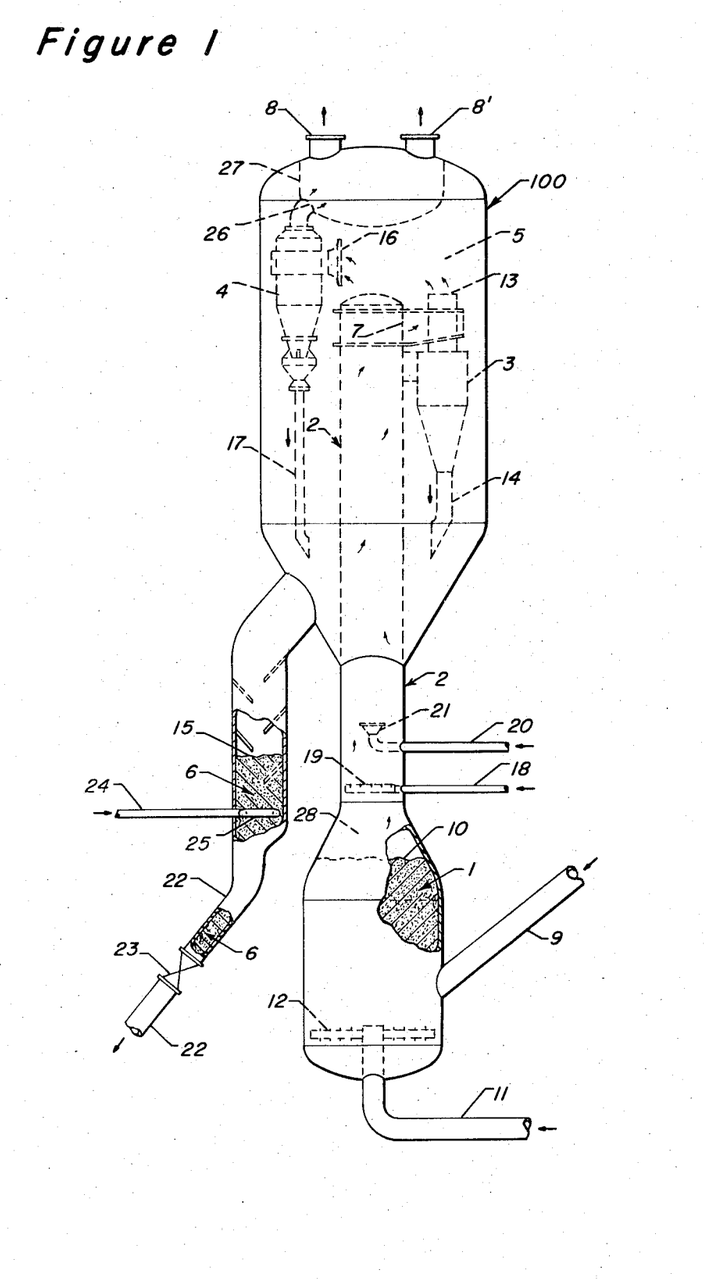

FIG. 1 shows a regeneration apparatus 100 basically containing a first dense bed 1, a dilute phase transport riser 2, a catalyst and regeneration gas separation means 3 and 4, a disengaging space 5 and a second dense bed 6. First dense bed 1 is shown at the lower portion of the figure and is connected to one end of a vertically extending dilute phase riser 2 through a transition region 28. Catalyst and regeneration gas separation means 3 is attached to the outlets 7 of transport riser 2. Separated regeneration gas leaving separation means 3 passes into disengaging space 5 then into separation means 4 where it exits at 26 into plenum chamber 27. Regeneration gas leaves the plenum chamber 27 and the regeneration zone 100 via outlet 8 and 8'. Separated catalyst from separation means 3 and 4 is directed toward second dense bed 6.

Spent catalyst is introduced through inlet line 9 to the first dense bed 1 having a level indicated at 10 which is located in a transition region 28 positioned between the first dense bed 1 and the transport riser 2. Fresh regeneration gas is introduced via line 11 into dense bed through distributing device 12 which allows the fresh regeneration gas to be more readialy dispersed within the dense bed 1. Typically the distributing device can be a metal plate containing holes or slots or preferrably a pipe grid arrangement, both types of which are quite familiar to those skilled in the art. Oxidation of the carbonaceous deposits takes place in dense bed 1 and regeneration gas and fluidized catalyst are carried out of bed 1 through the transition region 28 and into transport riser 2 wherein CO oxidation can take place.

Transport riser 2 is vertically positioned having its inlet at the lower portion and its outlet means 7 near its top portion. Outlet means 7 may be single or multiple openings located at or near the uppermost portion of transport riser 2 which allow catalyst and regeneration gas to pass out of transport riser 2. As shown in FIG. 1 catalyst and regeneration gas separation means 3 is attached to the outlets 7 of transport riser 2. Separation means 3, typically a cyclone separation means, is used to achieve a substantial separation of regeneration gas and entrained catalyst which pass out of transport riser 2. Although the FIG. 1 shows only one such cyclone attached to the transport riser 2, it is contemplated that from one to four cyclones could be so positioned. Entrained catalyst and regeneration gas pass via outlet 7 into the separation means 3 out of which regeneration gas substantially free of catalyst passes through outlet 13 while catalyst passes through dipleg 14 directed toward second dense bed 6. Optionally separation means 3 could be omitted, leaving regeneration gas and catalyst exiting outlet means 7 to directly enter disengaging space 5. Some separation of regeneration gas and catalyst would be achieved but not as efficiently as with cyclone separation means 3 as shown.

Separation means 4, also typically a cyclone separation means, has an inlet 16 which receives regeneration gas and any entrained catalyst located in the disengaging space 5. Regeneration gas and any entrained catalyst are substantially separated from each other with the regeneration gas passing out of the separation means 4 at outlet 26 into plenum chamber 27, and then out of the regeneration zone via regeneration gas outlet 8 and 8'. Catalyst separated from the regeneration gas is passed via dipleg 17 downward toward second dense bed 6 having a level as indicated at 15. Although only one such separation means 4 is shown, obviously more than one could be employed.

An external combustible fluid such as fuel gas or a liquid hydrocarbon stream may be admitted to the transport riser 2 through line 20 via distributor 21. The burning of such a fluid may be necessary to assist in the startup of the process or to increase the temperature within the dilute phase transport zone 2 sufficiently to initiate CO oxidation or it may be desirable to increase the temperature of the catalyst particles passing through the riser.

Additionally a second stream of fresh regeneration gas may be admitted to the transport riser through line 18 via distributor 19 for the purpose of supplying needed oxygen to support burning of the external combustible gas.

Catalyst passing through diplegs 14 and 17 discharges in a downward direction toward the second dense bed 6.

This second dense bed 6 is so positioned in relationship to the first dense bed 1 as to maintain a sufficient head of regenerated catalyst necessary to overcome any pressure drop in regenerated catalyst exit line 22, control valve 23, and in any equipment downstream connected to line 22. Although FIG. 1 shows the second dense bed 6 positioned immediately above the first dense bed 1, they may be separated by a sufficient distance to provide this head. Furthermore, the level 15 of catalyst within the second dense bed 6 may be so controlled as to provide the desired residence time within the bed.

Figure 2:
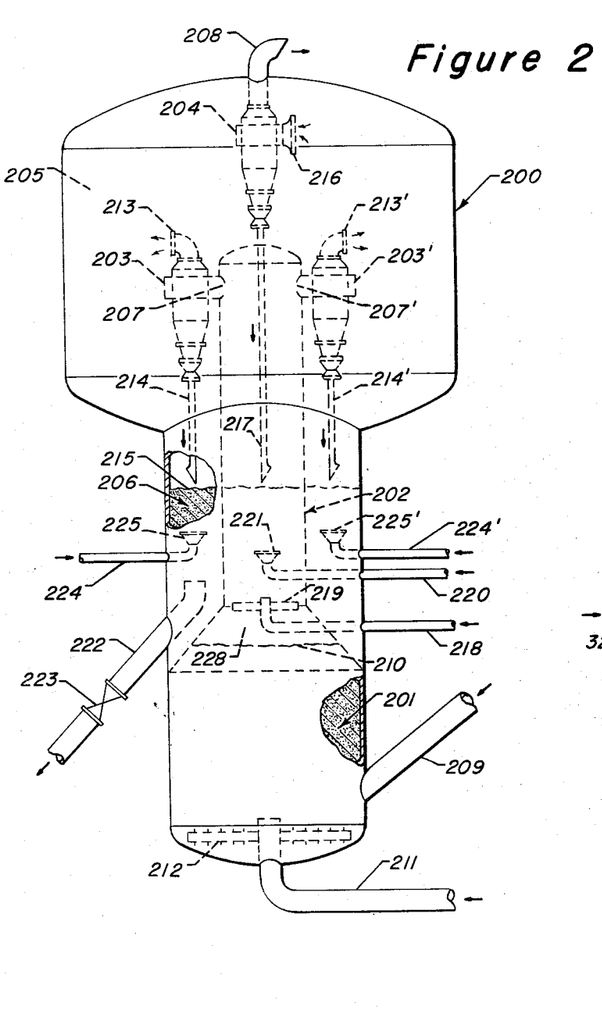
Figure 3:
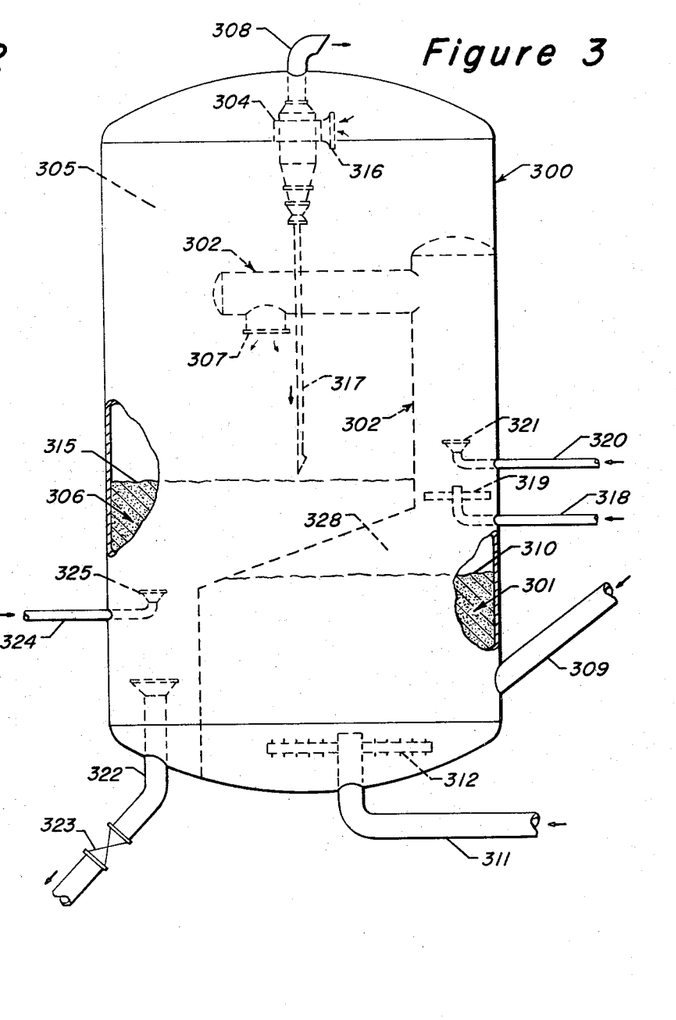

It should be noted that second dense bed 6 need not be a stripper as indicated in FIGS. 1, 2, and 3. The term second dense bed as used in this specification means regenerated catalyst maintained in dense phase for head and sealing purposes prior to being returned to the reaction zone.

The catalyst in bed 6 moves in a downward direction and eventually passes out of the regeneration vessel via conduit 22. Also located on conduit 22 is a valve 23 which may be used to control the rate of withdrawal of regenerated catalyst from bed 6. Typically, valve 23 is a slide valve and is operated by a reactor temperature controller or level controller.

A stripping medium may be admitted to the second dense bed 6 through line 24 via distributor pipe 25 to strip from the regenerated catalyst adsorbed and interstitial regeneration gas. Generally the stripping medium will be superheated steam.

It is anticipated in the process of this invention that most of the catalyst within the regeneration zone will be contained in the first dense bed with the smaller portion contained in the second dense bed. More specifically when steam stripping is employed within the second dense bed 6, the second dense bed volume will be so designed such that the catalyst residence time within the bed is less than one minute and preferrably less than 30 seconds.

Shown in FIG. 2 is an alternate apparatus 200 in which this invention may be practiced. Primary components are: a first dense bed 201, a dilute phase transport riser 202, a transition region 228, a catalyst and regeneration gas separation means 203 and 203' and 204, a disengaging space 205 and a second dense bed 206. First dense bed is again shown at the lower portion of the figure and is connected to one end of a vertically extending dilute phase riser 202 through a transition region 228. Catalyst and regeneration gas separation means 203 and 203' are attached to outlets 207 and 207' of transport riser 202. Separated regeneration gas leaving separation means 203 and 203' via outlets 213 and 213' passes into disengaging space 205, then into separation means 204, and finally exits the regeneration zone via line 208. Separated catalyst from separation means 203 and 203' and 204 is directed via diplegs 214, 214' and 217 to second dense bed 206.

Spent catalyst is introduced through inlet line 209 to the first dense bed 201 having a level indicated at 210 which is within the transition region 228. Fresh regeneration gas is introduced via line 211 into dense bed through distributing device 212 which allows the fresh regeneration gas to be more readily dispersed within the dense bed 201. Typically the distributing device can be a metal plate containing holes or slots or preferably a pipe grid arrangement, both types of which are quite familiar to those skilled in the art. Oxidation of the carbonaceous deposits takes place in dense bed 201 and regeneration gas and fluidized catalyst are carried out of bed 201 through the transition region 228 and into transport riser 2 wherein CO oxidation can take place.

Transport riser 202 is vertically positioned having its inlet at the lower portion and its outlet means 207 and 207' near its top portion. Outlet means 207 and 207' may be openings located at or near the uppermost portion of transport riser 202 which allow catalyst and regeneration gas to pass out of transport riser 202. As shown in FIG. 2 catalyst and regeneration gas separation means 203 and 203' typically cyclones, are attached to the outlets 207 and 207' of transport riser 202 and are used to achieve a substantial separation of regeneration gas and entrained catalyst passing out of transport riser 202 so that the material present in the disengaging space 205 is essentially regeneration gas with very little entrained catalyst present. Entrained catalyst and regeneration gas pass from riser 202 via outlets 207 and 207' into the separation means 203 and 203' where regeneration gas substantially free of catalyst passes out of the separation means through outlets 213 and 213' and catalyst passes through diplegs 214 and 214' in a downward direction toward second dense bed 206 having a level or interface 215. Preferably diplegs 214 and 214' pass into second dense bed 206 below the second dense bed catalyst level or interface 215. As mentioned in the FIG. 1 description, separation means 203 and 203' could be omitted, leaving regeneration gas and catalyst exiting outlet means 207 and 207' to directly enter disengaging space 205. Some separation of regeneration gas and catalyst would be achieved but not as efficiently as with cyclone separation means 203 and 203' as shown.

Separation means 204 also typically a cyclone separation means, has an inlet 216 which receives regeneration gas and any entrained catalyst located in the disengaging space 205. Regeneration gas and any entrained catalyst are substantially separated from each other with the regeneration gas passing out of the separation means 204 and out of the regeneration zone via regeneration gas outlet 208. Catalyst separated from the regeneration gas is passed via dipleg 217 down to the second dense bed 206.

An external combustible fluid such as fuel gas or a liquid hydrocarbon stream may be admitted to the transport riser 202 through line 220 via distributor 221 for the purpose of increasing the temperature of the regeneration zone upon initial startup or increasing the temperature within the dilute phase transport zone 2 sufficiently to initiate CO oxidation, or for increasing the temperature of the catalyst particles passing through the riser. Additionally a second stream of fresh regeneration gas may be admitted to the transport riser through line 218 via distributor 219 as in FIG. 1, for the purpose of supplying needed oxygen to support burning of the external combustible gas.

Catalyst passing through diplegs 214 and 214' and 217 discharges in a downward direction toward the second dense bed 206.

This second dense bed 206 is so positioned in relationship to the first dense bed 201 as to maintain a sufficient head of regenerated catalyst necessary to overcome any pressure drop in regenerated catalyst exit line 222, control valve 223, and in any equipment downstream connected to line 222. Although FIG. 2 shows the second dense bed 206 positioned immediately above the first dense bed 201, they may be separated by a sufficient distance to provide this head. As a consideration independent of dense bed location, the level 215 of the dense bed can be controlled as required to provide the desired catalyst residence time within the bed.

The catalyst in bed 206 moves in a downward direction and eventually passes out of the regeneration vessel via conduit 222. Also located on conduit 222 is a valve 223 which may be used to control the rate of withdrawal of regenerated catalyst from bed 206. Typically, valve 223 is a slide valve and as mentioned is generally operated by a reactor temperature controller or level controller.

A stripping medium may be admitted to the second dense bed 206 through lines 224 and 224' via distributors 225 and 225' to strip from the regenerated catalyst adsorbed and interstitial regeneration gas. Generally the stripping medium will be superheated steam.

As previously mentioned, it is anticipated in the process of this invention that most of the catalyst within the regeneration zone will be contained in the first dense bed with the smaller portion contained in the second dense bed. More specifically when steam stripping is employed within the second dense bed the second dense bed volume will be so designed such that the catalyst residence time within the bed is less than 1 minute and preferably less than 30 seconds.

FIG. 3 shows another alternate apparatus 300 suitable for practicing this invention. Specifically FIG. 3 represents a possible modification of existing regenerators to produce an apparatus suitable for carrying out the process of this invention. Basically an existing regeneration vessel 303 is modified to provide a first dense bed 301, a dilute phase transport riser 302, a second dense bed 306 and the associated equipment for riser 302 and bed 306. The portions of FIG. 3 generally function the same as those previously described for FIG. 1 and FIG. 2.

Briefly, spent catalyst is introduced through inlet line 309 into a first dense bed of catalyst 301 having a level or interface indicated at 310 located within transition region 328 positioned between first dense bed 301 and transport riser 302. Fresh regeneration gas is introduced at line 311 into dense bed 301 through distributing device 312. Oxidation of coke contained on the catalyst takes place in dense bed 301 and regeneration gas and fluidized catalyst are swept out of bed 301 through transition region 328 and into transport riser 302 wherein CO oxidation can take place.

A combustible fluid may be admitted to the transport riser 302 through line 320 via distributor 321 and either additionally a second stream of fresh regeneration gas may be admitted to the riser through line 318 via distributor 319.

Entrained catalyst and regeneration gas then pass out of transport riser 302 via riser outlet means 307 into disengaging space 305. Preferably outlet means 307 is so placed that it ejects entrained catalyst and regeneration gas in a downward direction to reduce the extent of catalyst entrained within the disengaging space 305.

Separation means 304, typically a cyclone separation means, has an inlet 316 and receives regeneration gas and any entrained catalyst from the disengaging space 305. Regeneration gas and any entrained catalyst are substantially separated from each other with the regeneration gas passing out of the separation means 304 and out of the regeneration zone 303 via outlet 308. Separated catalyst is passed via dipleg 317 in a downward direction toward a second dense bed 306. Interface 315 defines the boundary between the second dense bed 306 and the disengaging space 305.

Catalyst in bed 306 moves in a downward direction and leaves the bed and the regeneration zone through conduit 322. The rate of catalyst withdraw is controlled by valve 323 which is generally operated by a reactor temperature or level controller.

The stripping medium can be admitted to the second dense bed 325 through line 324 via distributor 325 to effect stripping of regeneration gas from regenerated catalyst.

DESCRIPTION OF THE INVENTION

Catalysts which can be used in the process of this invention includes to those well known to the art of fluidized catalytic cracking. Specifically the high activity zeolite-containing catalyst can be used and are preferred because of their higher resistance to the deactivating effects of high temperatures, exposure to steam, and exposure to metals contained in the feed stock. The well known amorphous catalysts may also be used and are specially suited to the process of this invention because the lower residence times employed in this process will extend their useful life.

Charge stocks used in the catalytic cracking process are mentioned here because contaminants such as Conradson carbon and metals such as nickel, iron, and vanadium found in the charge stock usually influence the regeneration operation, catalyst selectivity, catalyst activity and the fresh catalyst make-up rate required to maintain a constant activity. A high carbon content of the feed stock as measured by a Conradson carbon analysis reduces the capacity of those units that are limited by regeneration capacity. Furthermore, regeneration temperatures tend to increase with increasing carbon content. Metals contained in the feed are also deposited on the catalyst and not only change its selectively in the direction of less gasoline and more coke and light gas in a given reactor system but tend to deactivate the catalyst. Because of deleterious effects of Conradson carbon and metals, only feeds substantially free or containing but limited amounts of them are charged to most present cracking operations. For the elimination of Conradson carbons and metals such processes as vacuum distillation, deasphalting, visbreaking and coking have been used to prepare suitable feed stocks for fluid catalytic cracking. Typical and preferred feed stocks include the vacuum gas oils which boil within the range of about 400° to about 1,000° F. or higher depending on the limits set for Conradson carbon and metals. The term feed stocks can also include recycled materials such as gasoline, light or heavy cycle oils or slurry oil which are separated from the hydrocarbon effluent leaving the reaction zone by the main fractionation column. Because of the improved solid gas contact, shorter residence time, and smaller catalyst inventories of the process of the present invention, it is an advantage of this process over those employing conventional regeneration techniques that heavier, more contaminated feed stocks can be charged to the reaction zone for a given air rate (or coke burning capacity) and a given catalyst make-up rate.

This aspect and other aspects and advantages of the present process will be made clearer by a brief reference to a typical fluid catalytic cracking process with particular emphasis on the regeneration zone of such process.

In a typical process flow, finely divided regenerated catalyst which leaves the regeneration zone contacts a feed stock in a lower portion of a reaction riser zone. While the resultant mixture passes up through the riser conversion of the feed to lighter products and to coke deposited on the catalyst occurs. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separated hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feed stock to the reaction riser. Typically fractions such as light gases and gasoline are further separated and processed in a gas concentration process located downstream of the main column. Some of the fractions from the main column as well as those recovered from the gas concentration process may be recovered as final product streams. The separated spent catalyst passes into the lower portion of the disengaging space and eventually leaves that zone passing through a stripping means in which a stripping gas, usually steam, countercurrently contacts the spent catalyst purging adsorbed and interstitial hydrocarbons from the catalyst. The spent catalyst leaves the stripping zone and passes into a regeneration zone along with a fresh regeneration gas stream wherein combustion of coke produces a regenerated catalyst containing a reduced quantity of coke and a flue gas containing carbon monoxide, carbon dioxide, water, nitrogen, and perhaps a small quantity of oxygen. Typically the spent catalyst contains from 0.5 up to 1 or more wt. % coke while the freshly regenerated catalyst contains less than about 0.5 and more typically 0.2 to 0.4 wt. % coke. Typically the fresh regeneration gas passed into the regeneration zone is air but in some instances the air stream may be either enriched or deficient in oxygen. Flue gas is separated from entrained regenerated catalyst by cyclone separation means located within the regeneration zone and separated flue gas is passed from the regeneration zone typically to a carbon monoxide boiler wherein the chemical heat of carbon monoxide is recovered by combustion as a fuel for the production of steam. Regenerated catalyst which was separated from the flue gas is returned to the lower portion of the regeneration zone which is maintained as a dense bed of catalyst in varying stages of regeneration. Regenerated catalyst leaves this dense bed and as previously mentioned contacts the feed stock in a reaction zone. Generally, regenerated catalyst is not stripped of entrained flue gas prior to contacting the feed.

In a typical regeneration zone the spent catalyst is maintained in the bottom portion of the zone in one or more dense beds by limiting the superficial velocity of the incoming fresh regeneration gas. The superficial velocity is limited to the transport velocity, that is, the velocity past which the catalyst would be carried out of the dense bed to the cyclones. Typical velocities are therefore less than about 3 feet per second with 1.5 to 2.5 being the usual range.

Most of the total catalyst inventory of a fluid catalytic cracking process is contained in the regeneration zone. In view of the present industry trend toward short contact time reaction zones an even larger percentage of the total catalyst inventory is contained in the regeneration zone. The determination of the inventory in a typical regeneration zone is based upon the feed rate to the FCC process (or more specifically to the coke yield from that feed rate) and the superficial velocity. This coke yield anticipated from a desired feed rate determines the rate of the fresh regeneration gas to the regeneration zone. This gas rate at a limiting superficial velocity then determines the cross-sectional area of the regeneration zone. With a known catalyst density and height of the dense bed the inventory of the regeneration zone, and for practical purposes for the FCC process, is fixed. Catalyst residence times which result are generally from about 2 to 5 minutes with about 2 to 3 being the general range.

With the above description as a reference point, our process can briefly be described as a process in which spent catalyst removed from a reaction zone and containing coke thereon is regenerated in a regeneration zone comprising a first dense bed, dilute phase transport riser and a second dense bed with or without the combustion of carbon monoxide. Spent catalyst is passed into a first dense bed with fresh regeneration gas wherein coke is oxidized to produce a carbon monoxide containing regeneration gas. Regeneration gas and entrained catalyst pass from the first dense bed to a dilute phase transport riser wherein further oxidation of coke can take place. Catalyst and regeneration gas leaving the transport riser are separated and the regenerated catalyst is passed to a second dense bed. Depending upon operating conditions employed, carbon monoxide can be oxidized in the first dense bed or the dilute phase transport riser or both. In a preferred embodiment coke oxidation essentially takes place in the first dense bed and carbon monoxide oxidation takes place in the dilute phase transport riser.

Since it is not intended in the process of our invention that catalyst in the first dense bed remain in that bed the superficial velocity of the fresh regeneration gas into that bed is not limited to the critical velocity. In the first dense bed superficial velocities will be in the range of about 3 to 10 feet per second so that catalyst can be carried from the first dense bed into the dilute phase transport riser. Velocities contemplated for the dilute phase transport riser will be in the range of about 10 to 25 feet per second.

Since velocity is not only not limited to the critical velocity but is in fact two to three times the critical velocity, dramatic catalyst inventory reductions can now be achieved. As previously described, regeneration zone catalyst inventories are directly related to superficial velocities employed within the regeneration zone. Catalyst inventories using the process of this invention will be about 40 to 60 percent of those of present single or multistage regeneration processes. A moderately sized FCC process of the type presently in industry use will contain about 150 tons of catalyst. By using the regeneration process of this invention in an FCC process of the same size a refiner could save the initial investment represented by at least 75 tons of catalyst.

Catalyst make-up rates required to make-up losses and maintain activity will also be reduced because such rates tend to be a percentage of the total catalyst inventory. Conversely, as previously mentioned, heavier, more contaminated feed stocks could be charged to an FCC process employing this invention without requiring a make-up rate in excess of that presently accepted on an FCC process using conventional regeneration techniques. Feed stocks would no longer have to be limited to relatively clean vacuum gas oils containing limited quantities of Conradson carbon, metals, and nitrogen compounds. Higher molecular weight feed stocks containing higher amounts of these contaminants could better be tolerated with no additional economic penalty. Because such feed streams require less processing, the refiner will realize an additional savings.

Better solid-gas contact and reduced residence times of both catalyst and regeneration gas are other advantages of the higher velocity. Higher velocities will produce more turbulent flow with better mixing and hence will result in more efficient regeneration. Because of better gas-solid contact, higher oxygen partial pressure and higher temperatures the rate of coke combustion will be increased. Since coke will now be removed in a shorter amount of time, the catalyst residence time can be reduced. Catalyst residence times can be reduced from the present 2 to 5 minutes to less than 2 minutes and regeneration gas residence times can be reduced from about 20 seconds to less than 10 seconds. With shorter catalyst exposure time to high temperatures, catalyst activity will be prolonged and reduced make-up rates can result.

From the standpoint of savings to be effected another important result of shorter catalyst residence time is that it now allows the stripping of flue gas components from the regenerated catalyst. It is present industry practice to strip only spent catalyst; spent catalyst from a reaction zone is stripped of absorbed and interstitial hydrocarbons before the catalyst is sent to the regeneration zone for the purpose of recovering valuable gasoline and light hydrocarbons that would otherwise be burned in the regeneration zone. Although it is known that prolonged exposure to steam will deactivate catalyst, steam is generally the preferred stripping medium. The small amounts used, however; and the short catalyst residence time and low temperature within the reaction zone minimize any deactivation. In spite of the fact that flue gas components are entrained by regenerated catalyst into the reaction zone and hence become part of a product stream, steam stripping of regenerated catalyst has generally not been practiced because of the longer catalyst residence time in the regeneration zone and the large catalyst inventory which is generally contained in a single dense bed. Exposure of this quantity of catalyst to steam for this longer period of time would increase the catalyst deactivation rate. Steam would again be the preferred stripping medium rather than an inert gas because it can be condensed and separated before reaching the product recovery section of the FCC process. The following example and more detailed description will make clear this advantage of the process of this invention.

The effluent from the reaction zone of an FCC process actually contains not only hydrocarbons but steam from spent catalyst stripping and flue gas components in amounts from about 1 to 3 pounds per thousand pounds of catalyst circulated in the FCC process. In a typical FCC process of modest size about 3,000,000 lb./hr. of catalyst will be circulated and will therefore entrain about 4,500 lb./hr. of flue gas components into the reaction zone. This means that on a volume basis the reactor effluent will contain about 60,000 SCFH or 1,440,000 SCFD of flue gas components to be processed downstream of the reaction zone. The total reaction zone effluent is directed to the main column where it is separated into gas and unstabilized gasoline as an overhead product stream and various side cut product streams. This overhead product stream containing the flue gas components, light hydrocarbon gases, steam and gasoline is directed first to a main column overhead condenser where steam and gasoline are condensed and then to a main column overhead receiver.

In order to recover and separate light hydrocarbons and to stabilize the gasoline, the gas and unstabilized gasoline from the receiver are sent to a gas concentration process consisting primarily of a compressor, absorber columns, and fractionation columns along with associated equipment. To recover the light hydrocarbons the gas stream containing flue gas components from the receiver is first compressed to about 150 to 250 psig. before being directed to the absorber columns. Light hydrocarbons, primarily $C_3$'s and $C_4$'s, are absorbed by heavier liquid hydrocarbon streams in the absorber columns leaving an unabsorbed lean gas containing the flue gas components as a product stream from the last absorber. A typical analysis of the off gas leaving the last absorber is as follows:

Table No. 1

Absorber Off Gas

| Composition | Mol. % |
| --- | --- |
| Carbon dioxide | 3.8 |
| Oxygen + argon | 0.3 |
| Nitrogen | 22.8 |
| Carbon monoxide | 4.5 |
| Hydrogen | 8.9 |
| Methane | 23.6 |
| Ethylene | 11.8 |
| Ethane | 12.5 |
| Propylene | 4.8 |
| Propane | 1.4 |
| Isobutylene + 1-butene | 0.7 |
| Cis - 2 - butene | 0.4 |
| Trans - 2 - butene | 0.5 |
| Isobutane | 1.7 |
| Normal butane | 0.5 |
| Isopentane | 0.7 |
| Normal pentane | 0.2 |
| Total $C_6$+ and $C_5$ olefins | 0.9 |
| | 100.0 |

As can be seen from the breakdown, the entrained flue gas components, nitrogen, carbon monoxide, and carbon dioxide constitute about one third of this product stream. (31.1 percent). Because of the short catalyst residence time employed in the process of our invention, steam stripping of the regenerated catalyst can be employed whereby most of this material will be carried out of the regeneration zone rather than becoming a substantial part of this product stream. Without these components, considerable savings can be realized by using a less expensive gas plant, that is, one having smaller compressors and smaller absorbers along with other gas handling equipment. As well, the absorber off gas which is generally used a fuel will have a higher heat content.

In the process of the present invention oxidation of coke can take place in one or more places within the regeneration zone, namely within the first dense bed or the dilute phase transport riser or both. Although such coke oxidation can be done without oxidation of the CO thereby produced, in most instances conditions will be employed such that the coke oxidation will be accompanied, in either the first dense bed or the transport zone or both, by the oxidation of CO. Preferably most of the coke oxidation will be confined within the first dense bed and most of the CO oxidation or afterburning will be done in the transport riser. The reason for this is again exposure time to high temperatures. Temperatures produced from CO oxidation are higher than those required for simple coke oxidation and it is desirable to hold the residence time of the catalyst shorter in the transport riser than in the dense bed. It is therefore preferred that the higher temperature due to CO oxidation be in the transport riser where the catalyst residence time is very short. If it were desired that little or no oxidation of CO take place, the temperatures employed in the regeneration zone would be in the range of 1,150° to 1,250° F. At about 1,250° to about 1,280° F. the afterburning of CO in the presence of oxygen begins to take place at a reasonable reaction rate with excess oxygen present and for the complete oxidation of CO temperatures in the range of about 1,275° to 1,400° F. would be employed.

A practical and economical advantage of essentially complete oxidation of CO within the regeneration zone is that it alievates an air pollution problem without the necessity of a CO boiler. In view of the more restrictive air pollution regulations the world over this is a very important advantage. Additionally the process of this invention uses within the process itself the chemical heat of combustion of CO. The heat of combustion of CO is transferred to the catalyst within the short residence time transport riser to produce regenerated catalyst at a higher delivery temperature thereby reducing the feed preheat requirement. Normally feed to the reaction zone is preheated to about 400° to 700° F. before contact with the regenerated catalyst to provide an additional heat input.

Pressures contemplated for use in the process of this invention are from about normal atmospheric pressure up to about 50 psig with the preferred range being 15 to 40 psig. Because of the improved gas-solid contact due to higher velocities and the higher coke burning rate because of higher temperatures and higher oxygen concentrations, lower pressures can be employed in the process of this invention with no penalty in coke burning capacity. For this reason the process may reverse the present industry trend toward higher pressure regeneration processes. Less expensive vessels and air blower or compressors having lower pressure ratings therefore can be used. Also we have found lower pressures to be desirable in the hydrocarbon reaction zone.

Spent catalyst as used in this specification means catalyst withdrawn from a reaction vessel because of reduced activity caused by coke deposits. Spent catalyst passing into the first dense bed can contain anywhere from a few tenths up to about 5 wt. % of coke but typically in FCC operations spent catalyst removed from the reaction zone contains from about 0.5 to about 1.5 wt. % coke. The regenerated catalyst as used in this specification is catalyst from which no more coke will be removed. The regenerated catalyst will typically contain less than about 0.5 wt. % coke and may contain as little as 0.05 or less wt. % coke depending on operation conditions used within the regeneration zone and the conversion level desired within the reaction zone. Partially regenerated catalyst as used in this specification is catalyst which has had at least a portion of coke removed.

The term regeneration gas as used in this specification shall mean, in a generic sense, any gas which is to contact catalyst or which has contacted catalyst within the regeneration zone. Specifically the term fresh regeneration gas shall include oxygen-containing gases such as air or oxygen enriched or deficient air which pass into the first dense bed of the regeneration zone to allow oxidation of coke on the spent catalyst therein. Partially spent regeneration gas shall refer to regeneration gas which has contacted catalyst within the first dense bed and which contains a reduced quantity of free oxygen. Typically the partially spent regeneration gas contains water, nitrogen, oxygen, carbon monoxide and possibly carbon dioxide. Spent regeneration gas shall means regeneration gas which contains substantially no carbon monoxide, from about a few tenths up to as much as 15 mole % free oxygen, carbon dioxide, nitrogen, and water.

One or more gas-solids separation means may be utilized to separate regeneration gas from entrained regenerated catalyst. Preferred separation means will be cyclone separators whose design and construction is well known to the art. A single cyclone may be used but preferably more than one of these cyclones will be used in parallel or in series flow to effect the desired degree of separation.

EXAMPLE

The following example is presented illustrating and comparing the process of our invention for the regeneration of spent catalyst with a conventional regeneration method. In both cases a commercially available molecular sieve catalyst, which had previously been contacted with a vacuum gas oil under cracking conditions in a reaction zone and which had been subsequently steam stripped in a stripping zone, was regenerated with air. The coke contained 10.1 wt. % hydrogen and coke on spent catalyst was about 0.9 wt. %. The conventional regeneration zone contained a single dense bed in the bottom portion of the zone with a large dilute phase disengaging space positioned above the dense bed. Flue gas from this regeneration zone was burned in a CO boiler. Analysis of the flue gas shown in the example was for a sample removed from the flue gas line before the CO boiler. In the process of our invention CO was essentially completely combusted within the dilute phase transport riser of the regeneration zone. The flue gas was sampled just before it was vented to the atmosphere.

Table No. 2

Regeneration Process Comparison

| | Conventional | Present Invention |
|---|---|---|
| Temperatures, °F. | | |
| Dense bed | 1190 | 1250 |
| Dilute phase | 1185 | — |
| Transport riser | — | 1365 |
| Flue gas | 1245 | 1360 |
| Second dense bed | — | 1340 |
| Pressure, psig | 24.6 | 20 |
| Net dry air to regenerator, lb./hr. | 232,170 | 231,290 |
| Dry air/coke, lb./lb. | 11.13 | 14.51 |
| Coke yield, wt. % of fresh feed (at 75% reaction zone conversion) | 6.61 | 5.05 |
| Coke on regenerated catalyst, wt. % | 0.2 | 0.02 |
| Vessel size, diameter, ft. | 25 | 16 |
| Catalyst residence time, min. | 3 | 0.9 |
| Gas residence time, sec. | 15.5 | 5.5 |
| Superficial velocity, ft./sec. | | |
| Dense bed | 2.4 | 5 |
| Dilute phase | 2.4 | 20 |
| Flue gas analysis, vol. % | | |
| $CO_2$ | 9.2 | 14.9 |
| Argon | 1.1 | 1.0 |
| $N_2$ | 79.2 | 82.3 |
| CO | 10.2 | 0* |
| $O_2$ | 0.2 | 1.8 |
| $CH_4$ | 0.1 | 0 |
| Regenerated catalyst stripping | no | yes |
| Feed preheat, °F. | 412 | 277 |
| Catalyst inventory, tons | 60 | 35 |

The comparison of the process of our invention with the conventional single stage regeneration process first of all shows the higher temperatures and higher oxygen concentration of our invention. The inlet oxygen concentration to each process is the same (air) but our process shows a higher outlet concentration 1.8 vol. % compared to 0.2 vol. %. The oxygen concentration within our regeneration zone is therefore higher than is that of the conventional regeneration zone. The higher regenerated catalyst temperatures of our invention has reduced the catalyst circulation rate and thereby reduced the coke yield at the same conversion level from 6.61 wt. % to 5.05 wt. %. This results in more liquid product yield from the reaction zone used in combination with our process. Because of the higher coke burning rate, (caused by the higher temperature and higher oxygen concentration) the higher superficial velocity, and the lower coke yield, our process not only used less air at a lower pressure than did the conventional process, but produced regenerated catalyst having a lower weight percent coke and flue gas containing substantially no CO. Thus, by combusting the CO within the regeneration zone an air pollution problem has been essentially eliminated without requiring a CO boiler and at the same time the feed preheat required has been reduced by about 135°F. Furthermore, the inventory of our process is about 40 percent less than that of the conventional process and therefore the size of the regeneration vessel is smaller. Although not shown, it is anticipated that because of the smaller inventory and shorter residence time catalyst makeup rates over a period of time will be less for our new process. As indicated in Table 2, the regenerated catalyst was stripped in the present invention but not in the conventional process. Although not shown in the table the advantage of this stripping would be apparent in a comparison of equipment sizes required in the gas concentration plant.

The above specific example has been presented to illustrate preferred embodiments and advantages of the process of our invention. We do not intend to unreasonably limit the claims of our process by specific reference to sizes, flow rates, pressures, or analyses.

We claim as our invention:

1. A process for the regeneration of a zeolite-containing or amorphous coke-contaminated spent hydrocarbon cracking catalyst, removed from a reaction zone, and the conversion of carbon monoxide, resulting from the oxidation of coke from said catalyst, to carbon dioxide, which process is operated within a pressure range from about normal atmospheric pressure to about 50 p.s.i.g. and comprises the steps of:
   a. passing said catalyst and a fresh free oxygen-containing regeneration gas to a first dense bed of fluidized particulate catalyst in a regeneration zone and oxidizing coke in said first dense bed maintained at oxidizing conditions by employing a temperature within the range of about 1,250°F. to about 1,400°F., a superficial gas velocity within the range of about 3 to about 10 feet per second, and a catalyst residence time of less than two minutes, to produce partially regenerated catalyst and partially spent regeneration gas containing CO;
   b. passing said partially regenerated catalyst and partially spent regeneration gas to a dilute phase transport riser communicating with and superimposed over said first dense bed and therein controlling conversion conditions including controlling the temperature within the range of about 1,275°F. to 1,425°F. and the superficial gas velocity within the range of about 10 to 25 feet per second to convert CO to $CO_2$, to produce spent regeneration gas;
   c. separating the thus-regenerated catalyst from said regeneration gas; and,
   d. introducing said regenerated catalyst to a second dense bed of particulate material, from which said regenerated catalyst is returned to said reaction zone.

2. The process of claim 1 further characterized in that said regenerated catalyst is stripped of spent regeneration gas in said second dense bed.

3. The process of claim 1 further characterized in that the total residence time of regeneration gas in said first dense bed and dilute phase transport riser is less than 10 seconds.

* * * * *